M. R. HUTCHISON.
SPEED DEVICE AND INDICATOR.
APPLICATION FILED NOV. 8, 1909. RENEWED MAR. 1, 1913.
1,068,135.
Patented July 22, 1913.
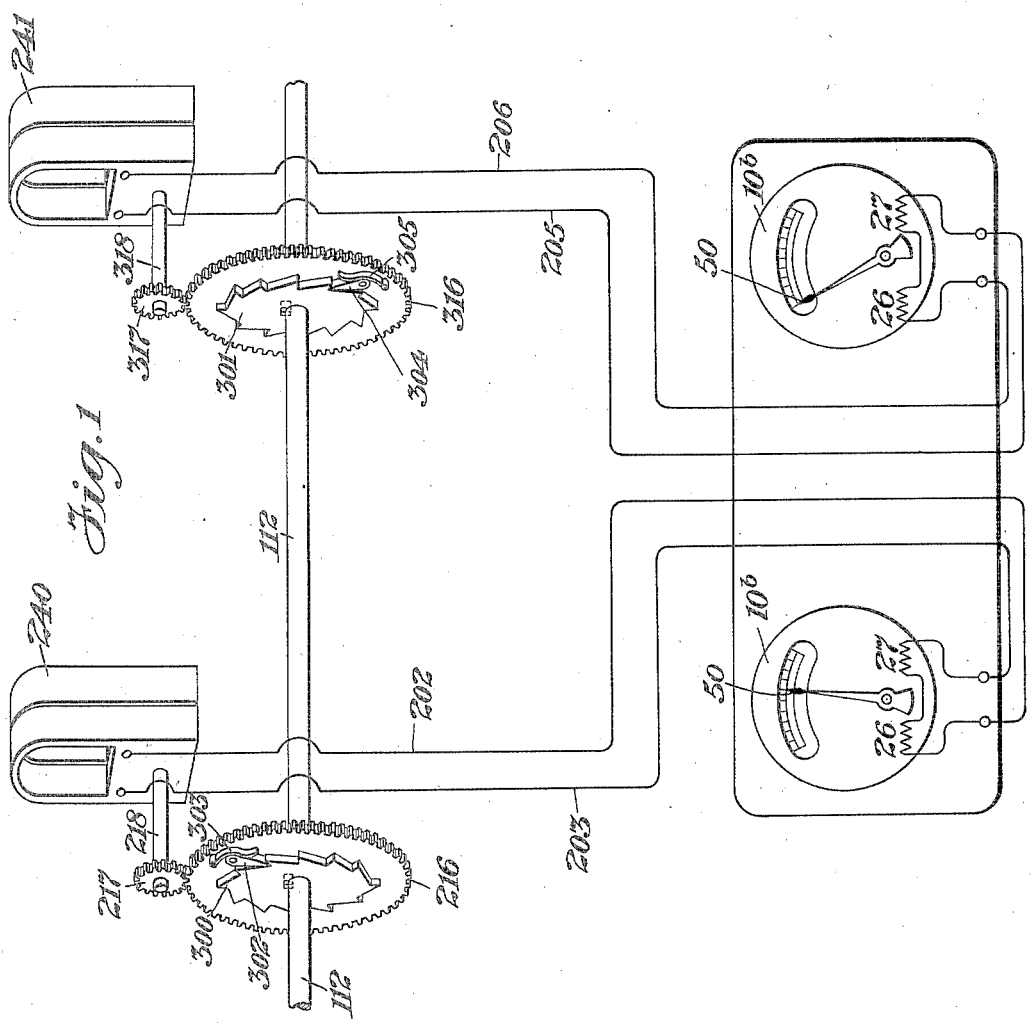

UNITED STATES PATENT OFFICE.

MILLER REESE HUTCHISON, OF SUMMIT, NEW JERSEY, ASSIGNOR TO THE INDUSTRIAL INSTRUMENT COMPANY, OF WATERBURY, CONNECTICUT, A CORPORATION OF CONNECTICUT.

SPEED DEVICE AND INDICATOR.

1,068,135. Specification of Letters Patent. Patented July 22, 1913.

Original application filed August 24, 1908, Serial No. 450,059. Divided and this application filed November 8, 1909, Serial No. 526,850. Renewed March 1, 1913. Serial No. 751,648.

*To all whom it may concern:*

Be it known that I, MILLER REESE HUTCHISON, a citizen of the United States, and a resident of Summit, in the county of Union and the State of New Jersey, have invented certain new and useful Improvements in Speed Devices and Indicators, of which the following is a specification.

My present application is a division of my application No. 450,059, filed August 24, 1908, wherein the various features of my invention are set forth at length.

My present invention relates to devices of the above type intended for use on reversible shafts, especially where the work performed when the shaft is rotated in one direction is different in kind or degree from the work done when the shaft is reversed, or where the work done by rotation in one direction tends to undo the work done by rotation in the other direction. A propeller shaft which normally drives the vessel forward but which tends to stop the vessel when reversed is a notable instance of such use.

It is characteristic of my speed indicator that the movement of the shaft is utilized to generate alternating pressures or currents which are used to produce the indications. Such alternating pressures or currents have no directional characteristic whereby currents generated by rotation in one direction may be distinguished from those generated by rotation in the other direction, and equal speeds of the reversible shaft in either direction will always produce equal indications upon a voltmeter or voltage operating device. Such being the case, an observer looking at the indicator would be informed upon the absence of any indication, or a zero indication being given, that the operation of the shaft had ceased, but upon movement of the indicating means resulting from rotation of the shaft it would be impossible to tell the direction of such shaft rotation. While in some instances the operation above described is of slight importance, yet where the rotation of the shaft in one direction tends to undo the work performed by rotation in the opposite direction, and notably in the case of the propeller shaft of a vessel, such an operation of the indicating means is absolutely to be avoided. For example, it is essential that the captain or pilot of a vessel equipped with an indicating device adapted to denote rotation of the propeller shaft to drive the vessel forward, be absolutely assured that any indication given by such device denotes rotation of the shaft for forward movement, and that he be as absolutely assured that no rotation of the shaft for backward movement will cause any forward indication to be given; absence of indication denoting, absolutely, absence of rotation of the shaft for forward movement. Moreover, it is also essential that it be possible to be informed of the presence or absence of forward rotation of the shaft by observation of a single indicating device, such as one comprising a single hand, pointer or other indicating means, and that an indication when given may be read and understood without the necessity for calculation based upon such indication. In such manner all possibility of error and confusion resulting from a false indication of forward shaft movement or possibility of wrong interpretation of an indication is absolutely avoided. Should it be desired, operation of the indicating device for forward rotation of the shaft having been prevented upon reversal of the shaft, other indicating means may be provided whereby the reverse rotation of the shaft is indicated.

My present invention has for its object the provision of certain improvements whereby an indicating device adapted to denote forward rotation of the shaft will be automatically thrown out upon reversal so as to prevent indications of forward speeds after reversal, the operation of the alternating voltage generator being checked and operation of the device thereby prevented without the use of a movable contact or switch in the circuit of the indicator.

It also includes improvements whereby a second indicating mechanism comprising an alternating voltage generator and an indicator may be used for reverse rotation of the shaft, said second indicating mechanism being automatically thrown in upon reverse rotation of the shaft and thrown out upon forward rotation without the use of a movable contact or switch in the circuit of the indicator.

The above described principles of my invention and the manner in which they may be embodied in speed indicators will be more fully understood from a detailed description thereof in connection with the accompanying drawing, in which like characters of reference denoting like parts are applied as in the corresponding figure of the drawings of said application No. 450,059.

The figure is a diagrammatic view showing a manner in which my invention may be practised.

In the figure I have shown means whereby an indicating mechanism for forward speeds of rotation of a reversible shaft may automatically be thrown out upon reversal of the shaft, and also means whereby a second separate indicating mechanism for reverse speeds of rotation of the shaft may automatically be thrown in upon reverse rotation of the shaft, and thrown out upon forward rotation. Moreover, the instruments are thrown in or out, as has been stated, without the use of a movable contact or switch in the circuit of the indicator, and the indicators may be of the reactive induction type, in which there is no movable coil for the index.

In said figure the shaft 112 may be any driven or driving shaft whose rates are proportional to the rates of speed or work to be indicated. A generator 240 is driven from said shaft 112 when rotated in a forward direction, being adapted to remain idle upon reversal of the shaft. Any mechanical means may be used for this purpose, as for instance, the toothed ratchet wheel 300 keyed to the shaft 112 operating to drive the loose gear 216 through pawl 302. The loose gear 216 meshes with a pinion 217 on the inductor shaft 218 of generator 240. The pawl 302 is held normally in operative relation to the ratchet wheel by means of spring 303. When the shaft 112 is rotated in a forward direction the ratchet wheel 300 engages pawl 302, generator 240 is driven and the voltages therefrom are applied through lead 202, coils 26 and 27 (indicated as adapted to react upon a movable body of metal connected to or forming an extension of the index), and return 203, thereby causing deflection of index 50 of the indicator 10$^b$ to denote forward speeds of rotation of shaft 112. When the shaft 112 is reversed pawl 302 slips, the generator 240 being inoperative and no deflection of the index of indicator 10$^b$ resulting on reverse rotation of the shaft. In like manner, a second generator 241 may be arranged to be driven from shaft 112 upon reverse rotation of the same, through ratchet wheel 301 (toothed reversely from ratchet 300) keyed to the shaft 112, operating through pawl 304 (arranged reversely from pawl 302) to drive loose gear 316 meshing with pinion 317 on the inductor shaft 318 of generator 241. The pawl 304 is held against the ratchet wheel 301 by a spring 305. Upon reverse rotation of shaft 112 generator 241 is driven, the voltages therefrom being applied through lead 205, coils 26 and 27, and return 206 to cause deflection of the index 50 of a second indicator 10$^b$ to denote reverse speeds of rotation of shaft 112. Thus it will readily be seen that when two separate indicating mechanisms are used, one is driven while the other is idle upon rotation of the shaft in one direction, while upon reversal of the shaft, the second driven upon reversal of the shaft, the throwing out and throwing in of the mechanisms being automatically effected, and false indications of shaft rotation being prevented.

While this arrangement makes possible the use of indicators having no movable coil, it is obvious that any desired device responding proportionally to the voltages may be employed. The indicators are calibrated in any desired manner.

While I have herein fully shown and described and have pointed out in the appended claims certain novel features of construction, arrangement and operation which characterize my invention, it will be understood by those skilled in the art that various omissions, substitutions and changes in the forms, proportions, sizes and details of the device and of its operation may be made without departing from the spirit of my invention.

I claim—

1. In an apparatus of the class described, a reversible shaft, two sets of indicating apparatus each adapted to indicate rates in one direction only, connections from the shaft to each of said sets of indicating apparatus, the connections for one of said sets being operative, and the connections for the other of said sets being inoperative, when the shaft rotates in one direction, and vice versa, when the shaft rotates in the other direction.

2. In an apparatus of the class described, a reversible shaft, two independent unbroken circuits of normally constant resistance each including a separate electrical generator and a separate indicator, and a connection from each of said generators to the shaft, the connections of one generator to the shaft being operative and the connections from the other generator to the shaft being inoperative when the shaft rotates in one direction and vice versa when the direction of the rotation of the shaft is reversed.

3. In an apparatus of the class described, a reversible shaft, two independent unbroken circuits of normally constant resistance each including a separate electrical generator and a separate indicator, a connection from each of said generators to the shaft, and a pawl and ratchet device in each of said last named connections, said pawl and ratchet devices being reversely arranged, whereby one of said connections is operative and the other inoperative when the shaft rotates in one direction and vice versa when the direction of rotation of the shaft is reversed.

4. In an apparatus of the class described, a reversible shaft, two independent unbroken circuits of normally constant resistance each including a separate alternating current generator and a separate indicator, and a connection from each of said generators to the shaft, the connections of one generator to the shaft being operative and the connections from the other generator to the shaft being inoperative when the shaft rotates in one direction and vice versa when the direction of rotation of the shaft is reversed.

5. In an apparatus of the class described, a reversible shaft, two independent unbroken circuits of normally constant resistance each including a separate alternating current generator and a separate indicator, a connection from each of said generators to the shaft, and a pawl and ratchet device in each of said last named connections, said pawl and ratchet devices being reversely arranged whereby one of said connections is operative and the other inoperative when the shaft rotates in one direction and vice versa when the direction of rotation of the shaft is reversed.

6. In an apparatus of the class described, a reversible shaft, two independent unbroken circuits of normally constant resistance each including a separate alternating current generator and the field coils of a separate reactive induction indicator, a connection from each of said generators to the shaft, one of which last named connections is operative and the other of which last named connections is inoperative when the shaft rotates in one direction and vice versa when the direction of rotation of the shaft is reversed.

7. In an apparatus of the class described, a reversible shaft, two independent unbroken circuits of normally constant resistance each including a separate alternating current generator and the field coils of a separate reactive induction indicator, a connection from each of said generators to said shaft, a pawl and ratchet device in each of said last named connections, said pawl and ratchet devices being reversely arranged whereby when the shaft is rotated in one direction one of the connections to the shaft is operative, and the other inoperative, and vice versa when the direction of rotation of the shaft is reversed.

Signed at New York city, in the county of New York and State of New York, this 5th day of November A. D., 1909.

MILLER REESE HUTCHISON.

Witnesses:
GEORGE C. DEAN,
IRVING M. OBRIEGHT.